(12) United States Patent
Cederlund

(10) Patent No.: US 7,575,396 B2
(45) Date of Patent: Aug. 18, 2009

(54) WAVE ATTENUATION SYSTEM

(75) Inventor: John W Cederlund, Union, IL (US)

(73) Assignee: Team Reil, Inc., Union, IL (US)

( * ) Notice: Subject to any disclaimer, the term of this patent is extended or adjusted under 35 U.S.C. 154(b) by 0 days.

(21) Appl. No.: 11/859,934

(22) Filed: Sep. 24, 2007

(65) Prior Publication Data

US 2009/0080981 A1    Mar. 26, 2009

(51) Int. Cl.
    E02B 3/06    (2006.01)
(52) U.S. Cl. .............................. 405/27; 405/26; 405/21
(58) Field of Classification Search .................. 405/21, 405/22, 26, 27, 28, 34, 35, 30, 223.1, 224
    See application file for complete search history.

(56) References Cited

U.S. PATENT DOCUMENTS

| | | | | |
|---|---|---|---|---|
| 3,276,210 A | * | 10/1966 | Stitt | 405/27 |
| 3,353,361 A | * | 11/1967 | Lloyd | 405/28 |
| 3,357,192 A | * | 12/1967 | Hibarger | 405/27 |
| 3,863,455 A | * | 2/1975 | Fuller | 405/27 |
| 3,884,042 A | * | 5/1975 | Anderson et al. | 405/27 |
| 3,953,977 A | * | 5/1976 | Kikui et al. | 405/27 |
| 3,969,901 A | * | 7/1976 | Matsudaira et al. | 405/26 |
| 4,150,909 A | * | 4/1979 | Hibarger et al. | 405/27 |
| 4,824,286 A | * | 4/1989 | Waas | 405/27 |
| 5,178,489 A | * | 1/1993 | Suhayda | 405/21 |
| 5,370,476 A | * | 12/1994 | Streichenberger | 405/25 |
| 5,429,452 A | * | 7/1995 | Frost | 405/26 |
| 5,707,172 A | | 1/1998 | Wilcox | |
| 5,820,295 A | * | 10/1998 | Buteaux | 405/21 |
| 6,102,616 A | * | 8/2000 | Foote | 405/26 |
| 6,450,737 B1 | | 9/2002 | Rytand et al. | |
| 6,715,958 B2 | | 4/2004 | Wittenberg et al. | |
| 6,938,571 B1 | * | 9/2005 | Pollack | 405/224 |

OTHER PUBLICATIONS

10 Pages printed from www.shoremaster.com, describing floating docks and wave attenuators from ShoreMaster.
3 Pages printed from www.wavebrake.biz, describing the Wave Brake wave attenuator.

* cited by examiner

*Primary Examiner*—Frederick L Lagman
(74) *Attorney, Agent, or Firm*—Wildman, Harrold, Allen & Dixon LLP

(57) ABSTRACT

A wave attenuation system having a floating member, at least one anchor member, and a plurality of interconnected wave attenuation members. The floating member has a generally flat top surface and a bottom surface. The top surface is configured to be disposed above a waterline and the bottom surface is configured to be disposed below the waterline. The anchor member is disposed below the water line and is interconnected with the floating member through at least one elastic member. The wave attenuation members are connected to the floating member and disposed below the bottom surface of the floating member.

26 Claims, 3 Drawing Sheets

WAVE ATTENUATION SYSTEM

FIELD OF THE INVENTION

This invention relates generally to wave attenuation systems and more particularly to floating wave attenuation systems.

BACKGROUND

Marine wave damage, such as shoreline erosion, damage to watercraft, and damage to other natural or man-made marine structures such as docks, boatlifts, etc., occurs when there is uninterrupted wave and wake turbulence. Wave attenuation systems, which are typically objects or structures that reduce or weaken wave energy by interrupting the flow of water through or past the structure, are employed to reduce or weaken the waves thereby reducing the potential damage done by the waves.

Wave attenuation systems, also know as breakwaters, can be either a fixed barrier or floating type. Fixed barrier systems are well known and as the name suggests are fixed to the bottom of the body of water. These systems can be made of stone, concrete, steel, armorstone, etc., and can be a defined, fabricated wall or merely a large pile of material. Because these systems are anchored into the bottom or by the mass of weight, they provide a rigid object that reflects wave energy.

Floating type breakwaters, as the name suggests, float in the water and need to be anchored to the bottom. Currently, commercially available floating systems are either concrete or plastic constructed systems. The concrete systems use a buoyant center, such as Styrofoam blocks to provide flotation and then pour concrete vertical side wave attenuation walls and possible a top wall to provide weight and strength to the system. These systems work much like fixed barrier breakwaters in that they provide a flat surface that is used to reflect wave energy. Some of the problems with concrete systems are that they are extremely expensive (some costing up to $15-20,000 per foot) and most are poured and built on site, which requires a large amount of equipment and labor.

Plastic wave attenuation systems use numerous hollow plastic modules, which can come in a variety of shapes and sizes, that are all connected together to form the breakwater. Although some of the wave energy will be reflected by the surfaces of the plastic modules, these systems typically work by making the water beneath the surface change direction and move through the maze like spaces between the modules, which disrupts and dissipates the wave energy. One of the major problems with current plastic wave attenuation systems is that they do not have any useable above water surface, such as a dock or raft surface or some concrete floating breakwaters, and cannot be used for anything other than a wave attenuator.

Therefore, there is a need for an efficient, low cost, easily installed and maintained floating wave attenuation system that provides a useable above water surface and can be used for additional purposes such as a work area for docking or mooring water craft.

SUMMARY

In one example, a wave attenuation system having a floating member, at least one anchor member, and a plurality of interconnected wave attenuation members is provided. The floating member has a generally flat top surface and a bottom surface. The top surface is configured to be disposed above a waterline and the bottom surface is configured to be disposed below the waterline. The anchor member is disposed below the water line and is interconnected with the floating member through at least one elastic member. The wave attenuation members are connected to the floating member and disposed below the bottom surface of the floating member.

In another example, a method for wave attenuation is provided having the steps of: positioning an anchor member into a body of water such that the anchor member rests on a bottom of the body of water; positioning a floating member having a generally flat top surface and a bottom surface into the body of water such that the top surface is disposed above a waterline of the body of water and the bottom surface is disposed below the waterline; connecting an elastic member between the anchor member and the floating member; interconnecting a plurality of wave attenuation members; and connecting the wave attenuation members to the floating member such that the wave attenuation members are disposed below the bottom surface of the floating member.

DETAILED DESCRIPTION

Figure 1:
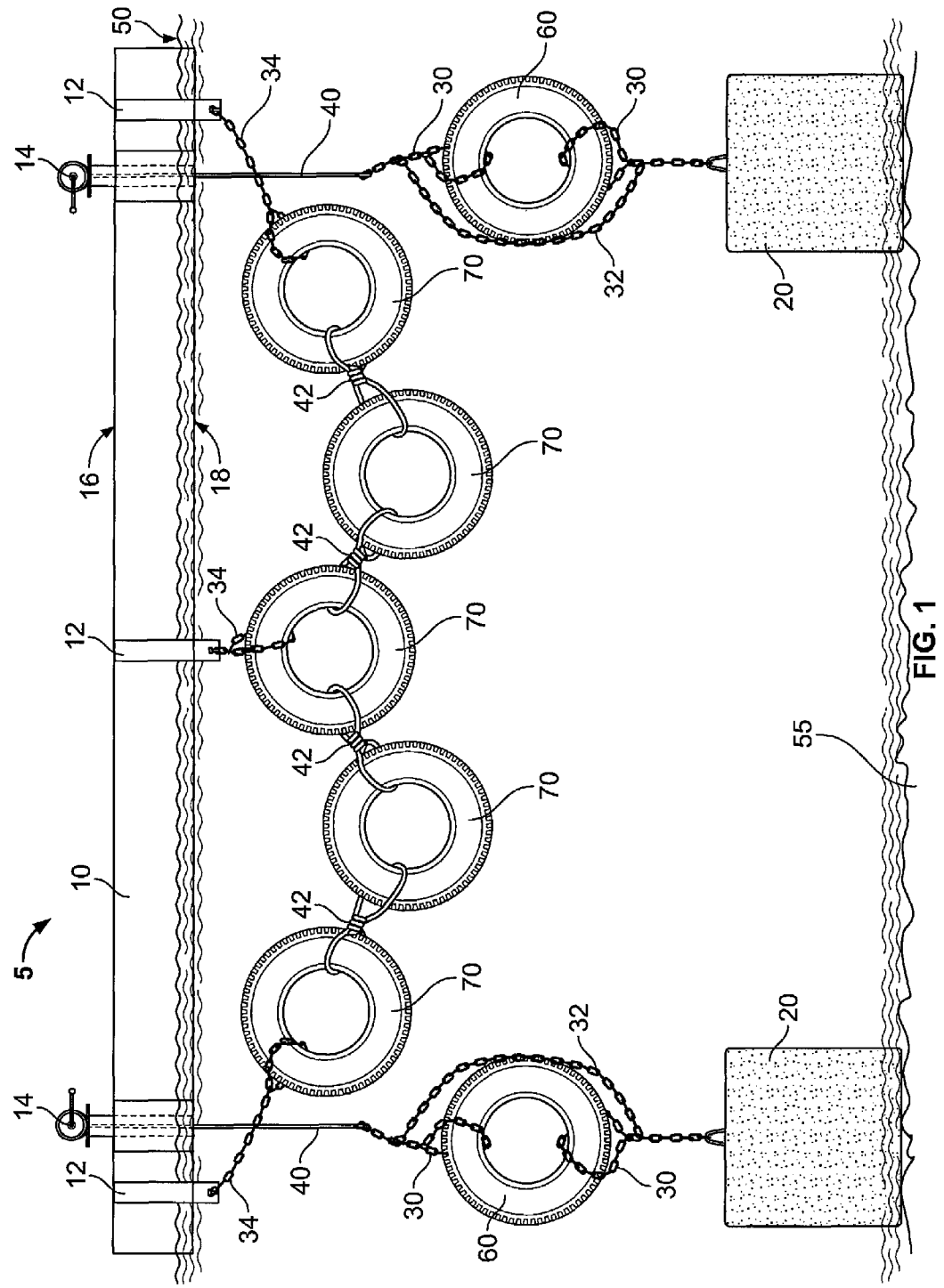
FIG. 1 is a side view of one example of a wave attenuation system.
Figure 2:
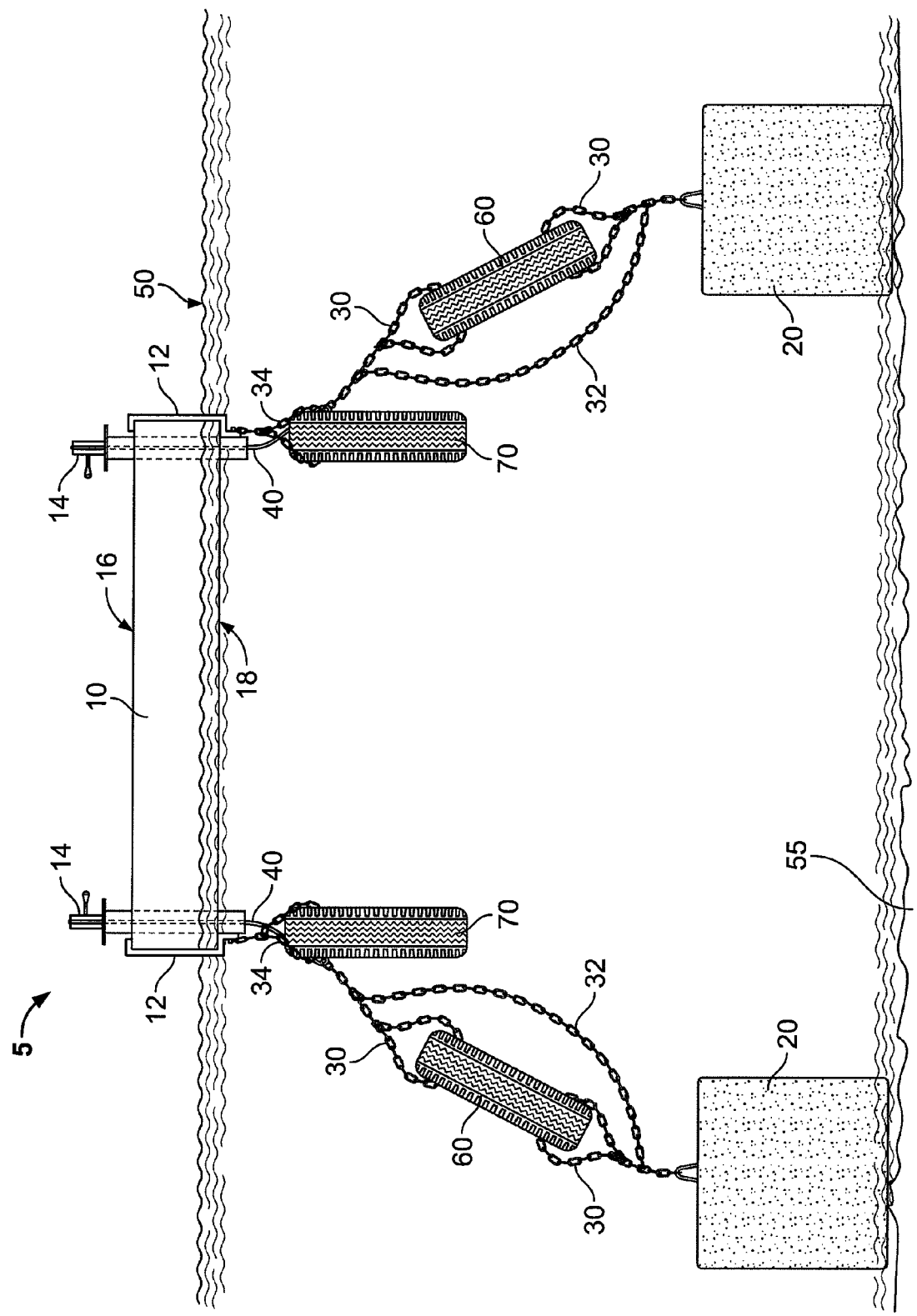
FIG. 2 is an end view the wave attenuation system of FIG. 1.

Referring to FIGS. 1 and 2, one example of a wave attenuation system 5 is shown, which generally has floating member 10, anchor members 20, elastic members 60, and wave attenuation members 70. Wave attenuation system 5 can be used in any body of water such as a lake, river, ocean, creek, inlet, harbor, etc., where wave attenuation is desired.

In this example, floating member 10 is a buoyant, generally planar structure, such as a floating dock section or raft. Floating member 10 could be a single dock section or multiple interconnected dock sections configured in any desired shape and size. Floating member 10 has generally flat top surface 16 and bottom surface 18. Bottom surface 18 of floating member 10 is located below waterline 50 of the body of water and top surface 16 will be above waterline 50, which provides a useable above water surface that is safe and secure. While floating member 10 is described herein a floating dock section or raft, floating member 10 could be any type of floating structure that has a generally flat top surface that remains above the waterline and that can support the weight of the system described herein.

Floating member 10 is interconnected to anchor members 20 through elastic members 60. In the example shown, four anchor members 20 are used, one near each corner of floating member 10. However, depending on various factors, such as the shape and size of floating member 10 and the degree of wave attenuation required, any number of anchor members 20 could be used. One interconnection between floating member 10 and anchor member 20 is described herein and it will be understood that the same interconnection applies in the examples shown to each of the floating member 10/anchor member 20 interconnections.

In this example, galvanized chains 30 and galvanized cables 40 are used to connected floating member 10 to elastic member 60. However, any method of connection could be used. Chain 30 is connected to elastic member 60 and extends to cable 40, where it is connected to cable 40 by a shackle. Cable 40 extends from chain 30 to floating member 10 and is secured to floating member 10. In this example, cable 40 runs through an opening in floating member 10 and engages winch 14, which could be permanently installed on floating member 10 or could be temporarily mounted to floating member 10 to assist in the installation and then removed. Winch 14 is used to retract excess cable 40 to provide the appropriate tension in cable 40 and chains 30. Although winch 14 can be used to assist in the installation of system 5, it is not required. In addition to assisting in the installation of system 5, winch 14 can also be used to increase or decrease the amount of cable 40 and the tension in cable 40 as water level 50 rises or falls. Elastic member 60 is also connected to anchor member 20 through galvanized chains 30, however, any method of connection could be used. Chain 30 is connected to elastic member 60 and extends anchor member 20 where it is connected to an eyebolt, or other connection device, in anchor member 20 by a shackle.

Figure 3:
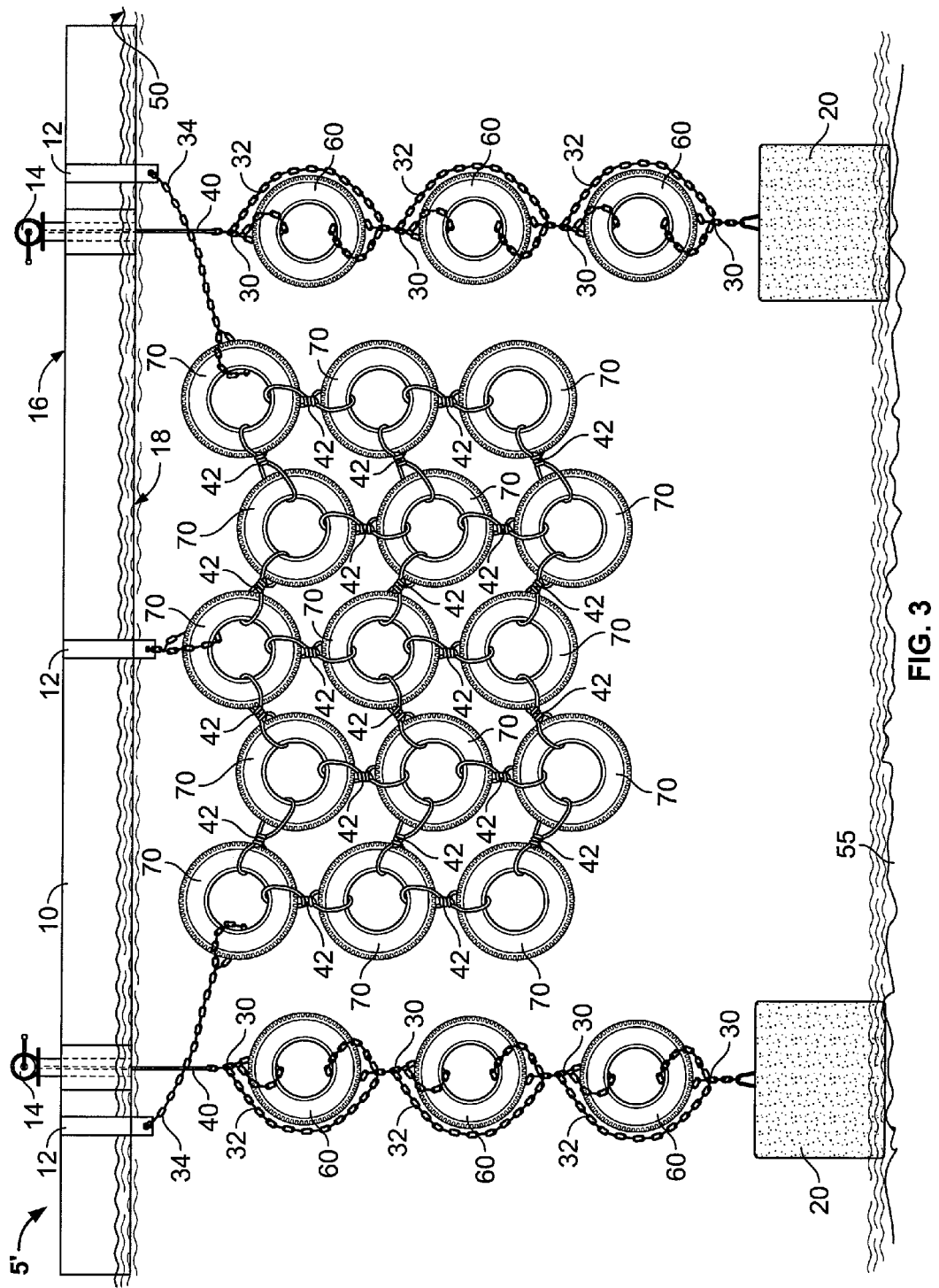
FIG. 3 is a side view of a second example of a wave attenuation system.

Safety chain 32 is connected to chain 30 running between elastic member 60 and anchor member 20 and to chain 30 running between elastic member 60 and cable 40. Safety chain 32 is used to keep floating member 10 connected to anchor member 20 in the event that elastic member 60 breaks or fails. In addition, as can be seen in FIG. 3, in another example wave attenuation system 5' could have multiple elastic members 60 between floating member 10 and anchor member 20.

In this example, elastic member 60 is a 24 inch recycled heavy duty truck tire. Tires are durable, will not break down when continually submersed in water, and are relatively environmentally safe when used in this type of application. The elasticity of elastic member 60 helps to relieve stress in chains 30 and cables 40 when floating member 10 encounters waves. As the side of floating member 10 is hit by a wave, floating member 10 will attempt to move with the wave in a lateral direction and in a vertical direction. However, elastic member 60 will prevent the movement of floating member 10 and will absorb some of the energy of the wave by deforming and then returning to its original shape. While recycled truck tires are used in this example for elastic members 60, any structure could be used that provides sufficient elasticity to ease the strain placed on chains 30 and cable 40 and to assist in absorbing the energy.

In addition to providing a strain relief/shock absorbing function, elastic member 60 could also be used to provide some additional wave attenuation. In this example, the relatively large cross sectional area of the tires impedes the wave and dissipates the wave energy. In this particular example, the hole in the center of the tire is also a benefit as it provides an additional path for the flow of the disrupted water, which further dissipates the wave energy.

Anchor member 20 in this example sits on bottom 50 of the body of water and in this example is a 3 ft×3 ft×3 ft concrete deadweight that weighs approximately 4000 pounds. Alternatively, rather than concrete weights, anchor members 20 could be any type of anchoring device that can be used to anchor floating member 10 in place. As discussed above, in this example four anchor members 20 are used, however, any number of anchor members 20 could be used depending on the installation requirements. As can be seen in FIG. 1, when viewed from the side, or in the general direction of wave travel, anchor members 20 are positioned directly beneath the connection points to floating member 20 such that chains 30 and cables 40 are generally vertical and are positioned approximately every 20 feet. As can be seen in FIG. 2, when viewed from the end, or generally perpendicular to the direction of wave travel, anchor members 20 are positioned outside of the connection points to floating member 20 such that chains 30 and cables 40 angle outward.

Wave attenuation members 70 are also mounted beneath floating member 10. As shown in FIGS. 1 and 2, in this example, multiple wave attenuation members 70 are interconnected in a generally linear configuration with galvanized cables 42 and are connected to brackets 12 on floating member 10 through galvanized chains 34. In the example shown, wave attenuation members 70 are installed along the sides of floating member 10 and are connected to brackets 12 that are located every 10 feet along floating member 10.

In this example, wave attenuation members 70 are also 24 inch recycled heavy duty truck tires as described above. In addition to the shape and cross-sectional area benefits discussed above, on additional benefit of using tires for wave attenuation members 70 is that the tires are not buoyant and therefore will drop beneath bottom surface 18 of floating member 10. Since much of a wave's energy is located beneath the surface, the deeper the wave attenuation members 70, the more wave energy can be dissipated.

If greater wave attenuation is required, more wave attenuation members 70 could be mounted beneath floating member 10. As shown in FIG. 3, in another example wave attenuation system 5' could have multiple wave attenuation members 70 interconnected in a matrix configuration, which provides a greater surface area for the attenuation of the wave energy and provides deeper attenuation, which assists in the attenuation of higher waves.

In use, wave attenuation members 70, and possibly elastic members 60, interrupt the wave energy much like a windscreen. When a wave mass hit wave attenuation members 70, the face of each member diverts the energy through and around the members 70, which reduces the wave force below the water. In addition, with anchor members 20 holding floating member 10 in place, elastic members 60 act as shock absorbers to allow floating member 10 to rise and fall and move laterally. For the duration of each wave, or wave length, the water must travel around wave attenuation members 70, and in this example elastic members 60, which dissipates the wave energy by hydraulic resistance. By using floating member 10, the laminar flow of the water is also interrupted at the surface, which causes disorganization and chaos in the incoming wave action thus reducing the damaging energy of the wave.

Some additional benefits of wave attenuation system 5, 5' are that it works below the water surface, which maintains the visual ambiance of the natural setting. In addition, unlike the other plastic wave attenuators described above, the above system is unobtrusive while useful, since it provides a useable above water surface that is safe and stable and can be walked on for maintenance or used for marine craft dockage if desired. System 5, 5' is also maintenance free, is damage resistant, and has been found to encourage fish and other natural underwater habitation. The use of recycled tires also promotes conservation and has little to no negative environmental impact. Finally, unlike the concrete wave attenuators described above, system 5, 5' is relatively inexpensive, is easy to install, and is easily maintained.

The foregoing description of exemplary embodiments of the invention has been presented for purposes of illustration and description, and is not intended to be exhaustive or to limit the invention to the precise form disclosed. The descriptions were selected to best explain the principles of the invention and their practical application to enable other skills in the art to best utilize the invention in various embodiments and various modifications as are suited to the particular use contemplated. It is intended that the scope of the invention not be limited by the specification, but be defined by the claims set forth below.

What is claimed is:

1. A wave attenuation system, comprising:
   a floating member comprising a generally flat top surface and a bottom surface, the top surface being configured to be disposed above a waterline and the bottom surface being configured to be disposed below the waterline;
   at least one anchor member disposed below the waterline and interconnected with the floating member through at least one tire; and
   a plurality of interconnected wave attenuation members connected to the floating member and disposed below the bottom surface of the floating member.

2. The wave attenuation system of claim 1, wherein the floating member is a floating dock section.

3. The wave attenuation system of claim 1, wherein the anchor member is a concrete weight.

4. The wave attenuation system of claim 1, wherein the floating member is connected to the tire through one of a galvanized cable and a galvanized chain.

5. The wave attenuation system of claim 1, wherein the anchor member is connected to the tire trough one of a galvanized cable and a galvanized chain.

6. The wave attenuation system of claim 1, wherein the anchor member is interconnected with the floating member through a plurality of tires.

7. The wave attenuation system of claim 1, wherein the plurality of wave attenuation members are non-buoyant.

8. The wave attenuation system of claim 1, wherein the plurality of wave attenuation members are tires.

9. The wave attenuation system of claim 1, wherein the plurality of wave attenuation members are connected to the floating member through one of a galvanized cable and a galvanized chain.

10. The wave attenuation system of claim 1, wherein the plurality of wave attenuation members are interconnected in a generally linear configuration.

11. The wave attenuation system of claim 1, wherein the plurality of wave attenuation members are interconnected in a matrix configuration.

12. The wave attenuation system of claim 1, wherein the anchor member is interconnected with the floating member through a plurality of elastic members and the tire is one of the plurality of elastic members.

13. The wave attenuation system of claim 12, wherein the plurality of elastic members are all tires.

14. A method for wave attenuation, comprising the steps of:
   positioning an anchor member into a body of water such that the anchor member rests on a bottom of the body of water;
   positioning a floating member comprising a generally flat top surface and a bottom surface into the body of water such that the top surface is disposed above a waterline of the body of water and the bottom surface is disposed below the waterline;
   connecting a tire between the anchor member and the floating member;
   interconnecting a plurality of wave attenuation members; and
   connecting the wave attenuation members to the floating member such that the wave attenuation members are disposed below the bottom surface of the floating member.

15. The method of wave attenuation of claim 14, wherein the anchor member is a concrete weight.

16. The method of wave attenuation of claim 14, wherein the floating member is a floating dock section.

17. The method of wave attenuation of claim 14, wherein the anchor member is connected to the tire trough one of a galvanized cable and a galvanized chain.

18. The method of wave attenuation of claim 14, wherein the floating member is connected to the tire through one of a galvanized cable and a galvanized chain.

19. The method of wave attenuation of claim 14, wherein the wave attenuation members are non-buoyant.

20. The method of wave attenuation of claim 14, wherein the wave attenuation members are tires.

21. The method of wave attenuation of claim 14, wherein the wave attenuation members are connected to the floating member trough one of a galvanized cable and a galvanized chain.

22. The method of wave attenuation of claim 13, wherein the wave attenuation members are interconnected through one of a galvanized cable and a galvanized chain.

23. The method of wave attenuation of claim 14, wherein the plurality of non-buoyant wave attenuation members are interconnected in a generally linear configuration.

24. The method of wave attenuation of claim 14, wherein the plurality of non-buoyant wave attenuation members are interconnected in a matrix configuration.

25. The wave attenuation system of claim 14, wherein connecting a tire between the anchor member and the floating member further comprises connecting a plurality of elastic members between the anchor member and the floating member and the tire being one of the plurality of elastic members.

26. The wave attenuation system of claim 25, wherein the plurality of elastic members are all tires.

* * * * *

UNITED STATES PATENT AND TRADEMARK OFFICE
CERTIFICATE OF CORRECTION

PATENT NO. : 7,575,396 B2  Page 1 of 1
APPLICATION NO. : 11/859934
DATED : August 18, 2009
INVENTOR(S) : John W. Cederlund It is certified that error appears in the above-identified patent and that said Letters Patent is hereby corrected as shown below:

Column 5, line 25, "trough" should be --through--.
Column 6, line 22, "trough" should be --through--.
Column 6, line 33, "trough" should be --through--.
Column 6, line 35, "13" should be --14--.

Signed and Sealed this

Third Day of November, 2009

David J. Kappos
*Director of the United States Patent and Trademark Office*